United States Patent
Blatt et al.

(10) Patent No.: US 11,429,730 B2
(45) Date of Patent: Aug. 30, 2022

(54) LINKING ENCRYPTED DATASETS USING COMMON IDENTIFIERS

(71) Applicant: Duality Technologies, Inc., Maplewood, NJ (US)

(72) Inventors: Marcelo Blatt, Modiin (IL); Yuriy Polyakov, Fair Lawn, NJ (US); Vinod Vaikuntanathan, Boston, MA (US)

(73) Assignee: Duality Technologies, Inc., Maplewood, NJ (US)

( * ) Notice: Subject to any disclaimer, the term of this patent is extended or adjusted under 35 U.S.C. 154(b) by 56 days.

(21) Appl. No.: 17/104,423

(22) Filed: Nov. 25, 2020

(65) Prior Publication Data

US 2021/0157932 A1 May 27, 2021

Related U.S. Application Data

(60) Provisional application No. 62/939,723, filed on Nov. 25, 2019.

(51) Int. Cl.
*G06F 11/30* (2006.01)
*G06F 21/60* (2013.01)
(Continued)

(52) U.S. Cl.
CPC ........ *G06F 21/602* (2013.01); *G06F 21/6218* (2013.01); *G06F 21/79* (2013.01);
(Continued)

(58) Field of Classification Search
CPC .... G06F 21/602; G06F 21/6218; G06F 21/79; G06F 2221/0751; H04L 9/008; H04L 9/085
See application file for complete search history.

(56) References Cited

U.S. PATENT DOCUMENTS 10,216,940 B2 * 2/2019 Zwinger ............... G06F 21/602
10,460,098 B1 * 10/2019 Wang .................. H04L 63/0838
(Continued)

OTHER PUBLICATIONS

Yossi Azar, Andrei Z. Broder, Anna R. Karlin, and Eli Upfal. Balanced allocations. *Siam J. Comput.*, 29(1):180-200, Sep. 1999.
(Continued)

*Primary Examiner* — Gary S Gracia
(74) *Attorney, Agent, or Firm* — Pearl Cohen Zedek Latzer Baratz LLP (57) ABSTRACT

A device, system and method for linking encrypted data sets using common encrypted identifiers in encrypted space. A first and second parties' encrypted data sets may include first and second respective encrypted data and associated first and second respective encrypted identifiers. The first and second encrypted identifiers may be converted into a first and second respective sets of a plurality of elemental identifier components. Each of the plurality of elemental identifier components in each component set characterizes a distinct numeric property of the corresponding converted encrypted identifier. The first and second sets of the plurality of elemental identifier components may be composed, component-by-component, to generate a plurality of component-specific results. If the plurality of component-specific results are determined to satisfy a matching criterion indicating that the first and second encrypted identifiers match, the first and second encrypted data associated with the first and second matching encrypted identifiers may be linked.

30 Claims, 3 Drawing Sheets

(51) Int. Cl.
  *G06F 21/62* (2013.01)
  *H04L 9/08* (2006.01)
  *H04L 9/00* (2022.01)
  *G06F 21/79* (2013.01)
  *G06F 12/14* (2006.01)

(52) U.S. Cl.
  CPC .............. *H04L 9/008* (2013.01); *H04L 9/085* (2013.01); *G06F 2221/0751* (2013.01)

(56) References Cited

U.S. PATENT DOCUMENTS

| | | | | |
|---|---|---|---|---|
| 11,004,548 B1* | 5/2021 | Austin | .................. | H04L 9/3226 |
| 2006/0218060 A1* | 9/2006 | Lawlor | .................. | G06Q 40/10 |
| | | | | 705/32 |
| 2011/0060905 A1* | 3/2011 | Stack | .................... | G06Q 30/02 |
| | | | | 713/167 |
| 2014/0282884 A1* | 9/2014 | Bao | ....................... | G06F 21/316 |
| | | | | 726/4 |
| 2015/0356256 A1* | 12/2015 | Cho | ........................ | G16Z 99/00 |
| | | | | 705/2 |
| 2016/0078431 A1* | 3/2016 | Ramachandran | .. | G06Q 20/3823 |
| | | | | 705/64 |
| 2017/0287246 A1* | 10/2017 | Baek | ......................... | G07C 9/28 |
| 2018/0316651 A1* | 11/2018 | Yang | .................... | H04W 12/122 |
| 2019/0272384 A1* | 9/2019 | Kawabata | ............. | H04L 9/0891 |
| 2019/0279203 A1* | 9/2019 | Ghosh | .................. | G06Q 20/383 |
| 2020/0089905 A1* | 3/2020 | Jones | .................. | G06F 21/6245 |
| 2020/0387484 A1* | 12/2020 | Rathor | ................ | G06F 16/2246 |
| 2021/0399874 A1* | 12/2021 | Polyakov | .................. | H04L 9/30 |

OTHER PUBLICATIONS

Zvika Brakerski, Craig Gentry, and Vinod Vaikuntanathan. (leveled) fully homomorphic encryption without bootstrapping. In *ITCS '12*, pp. 309-325, 2012.

Zvika Brakerski. Fully homomorphic encryption without modulus switching from classical gapsvp. In *CRYPTO* 2012—vol. 7417, pp. 868-886, 2012.

Hao Chen, Kim Laine, and Peter Rindal. Fast private set intersection from homomorphic encryption. In *Proceedings of the 2017 ACM SIGSAC Conference on Computer and Communications Security, CCS '17*, pp. 1243-1255, New York, NY, USA, 2017. ACM.

Junfeng Fan and Frederik Vercauteren. Somewhat practical fully homomorphic encryption. Cryptology ePrint Archive, Report 2012/144, 2012.

* cited by examiner

LINKING ENCRYPTED DATASETS USING COMMON IDENTIFIERS

CROSS-REFERENCE TO RELATED APPLICATIONS

This application claims the benefit of U.S. Provisional Patent Application Ser. No. 62/939,723, filed Nov. 25, 2019, which is hereby incorporated by reference in its entirety.

FIELD OF THE INVENTION

Embodiments of the invention relate to the field of data encryption, decryption and security.

BACKGROUND OF THE INVENTION

Today, massive amounts of data live in many organizations, with barriers between them, erected by mistrust, economic incentives and regulatory hurdles. When secret data, such as personal or medical data is involved, privacy becomes a major concern for all parties involved, as that information can be used to identify or exploit the individuals.

To encourage collaboration, while still protecting data secrecy, cryptosystems have been developed that allow parties to operate and execute computations on encrypted data sets (i.e., ciphertexts) in an encrypted domain. Multiple different parties may provide multiple different respective encrypted data sets, each of which is independently encrypted by its individual party with a different party-specific encryption key that cannot be decrypted by other parties. Often, the multiple encrypted datasets may have interrelated, overlapping, or complementary data. For example, one encrypted dataset may represent medical data for a patient, while another encrypted dataset may represent genetic data for the same patient. It may be desirable to merge these datasets, for example, to study common trends, correlations, etc. (e.g., joint computations), where the contributions from the combination of datasets is greater than their independent parts.

These types of joint computations, however, introduce security risks as the encrypted data sets often use secret information such as sensitive identifiers (e.g., social security numbers, credit card numbers, etc.) to identify and thus link common records in the datasets. To keep these identifiers secure, they too may be independently encrypted by their respective parties. Correlating encrypted identifiers in an encrypted space may be difficult and prohibitively slow using current methods, such as, fully homomorphic encryption comparisons. This inefficiency is only exacerbated as dataset size and thus the number of associated identifiers grows, which results in an exponential increase of pairwise combinations of identifier comparisons.

Accordingly, there is a long felt need in the art for secure and efficient techniques to link interrelated data from different encrypted datasets encrypted by different independent parties in an encrypted space.

SUMMARY OF EMBODIMENTS OF THE INVENTION

Embodiments of the invention solve this long felt need in the art by providing a device, system, and method for linking two or more encrypted datasets based on common identifiers (IDs) (or their hashes or derivative thereof). The IDs (or their hashes or derivatives) may also be encrypted.

In an embodiment of the invention, a device, system and method is provided for linking encrypted data sets using common encrypted identifiers in an encrypted space. A first and second parties' respective encrypted data sets may include first and second respective encrypted data and associated first and second respective encrypted identifiers. The data and identifiers typically cannot be unencrypted without one or more secret decryption keys. The first and second encrypted identifiers may be converted into a first and second respective sets of a plurality of elemental identifier components. Each of the plurality of elemental identifier components in each component set characterizes a distinct numeric property of the corresponding converted encrypted identifier. The first and second sets of the plurality of elemental identifier components may be composed, component-by-component, to generate a plurality of component-specific results. If the plurality of component-specific results are determined to satisfy a matching criterion indicating that the first and second encrypted identifiers match, the first and second encrypted data associated with the first and second matching encrypted identifiers may be linked. Joint computations may be executed on the linked first and second encrypted data in the encrypted and/or unencrypted space.

In an embodiment of the invention, a device, system and method is provided, in which one data set may be encrypted by an external (e.g., first) party, while another data set remains unencrypted by another (e.g., second) party that e.g., executes the identifier comparison internally without exposing the unencrypted data to any other party. An encrypted data set may be received, from the external party, including encrypted data and associated encrypted identifiers, but typically not receiving one or more secret encryption keys required to decrypt the encrypted data and encrypted identifiers. An unencrypted plaintext data set may be retrieved, from memory, comprising unencrypted data and associated unencrypted identifiers. The encrypted and unencrypted identifiers may be converted into respective encrypted and unencrypted sets of a plurality of elemental identifier components. Each of the plurality of elemental identifier components in each component set may represent a distinct numeric property of the corresponding respective converted encrypted and unencrypted identifier. The encrypted and unencrypted sets of the plurality of elemental identifier components may be composed, e.g., component-by-component, to generate a plurality of component-specific results. It may be determined if the plurality of component-specific results satisfy a matching criterion indicating that the encrypted and unencrypted identifiers match. The encrypted and unencrypted data associated with the encrypted and unencrypted matching encrypted identifiers match may be linked. The external party may be sent an indication of the linking to decrypt the encrypted data and link the decrypted data and the retrieved unencrypted data. Joint computations may be executed on the linked first and second data in the encrypted and/or unencrypted space.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

Embodiments of the invention provide a device, system, and method for linking encrypted data from two or more encrypted data sets that are independently encrypted by different encryptions keys by different respective parties in an encrypted space. Linking encrypted data may allow either party, or a third party, to execute joint computations over interrelated encrypted data from different datasets, together, so a party may learn more about the datasets cumulatively based on their commonalities than it would individually (e.g., computing a linear regression (inference) over common records from the different datasets). Because linking data sets typically uses sensitive identifiers (IDs) such as social security numbers that are common to both data sets, those IDs are often likewise encrypted independently by the different respective parties, and so, may be difficult or cumbersome to correlate conventionally.

Embodiments of the invention provide secure and efficient protocols to link two or more encrypted identifiers and their associated encrypted data differently encrypted by multiple different parties. According to some embodiments, instead of comparing full identifier strings in their entirety, encrypted identifiers may be broken up into atomic, elemental or base encrypted identifier components, which are then compared more efficiently and with more flexibility, than full encrypted identifier comparisons. Encrypted identifiers may be divided into elemental components characterizing properties of the identifier. Once such property is a digit-wise property in which each encrypted identifier is encoded by a plurality of digit-specific identifier components, as shown e.g., in FIG. 1. The number d of digit-specific identifier components may be equal to the number of digits in each encrypted identifier (e.g., to compare all digits in a one-to-one digit-by-digit comparison) or may be less than the number of identifier digits (e.g., to compare select digits, such as, higher order or non-decimal "rounded" numbers, or to compare other non-digit properties). Additionally or alternatively, the encrypted identifier may be encoded by a plurality of pattern-specific identifier components encoding its numeric patterns (e.g., parity, bit length, large vs. small numbers, repeating numbers, edges or visual features in images, or other number patterns). Identifier patterns may be particularly useful to link encrypted identifiers that partially, but do not exactly, match. For example, under non-deterministic or probabilistic encryption, the same identifier encrypted by the same encryption key may result in a different encrypted identifier each time it is encrypted. To match two such different encryptions of the same identifier involves searching for similar, but non-exact, numeric patterns.

Once each full-length encrypted identifier is broken down into its encrypted identifier components, the individual identifier components may be compared component-by-component. In the example of digit-wise matching, each encrypted ID is broken down into d digit-specific identifier components for an ID of length d. Each digit-component is then separately compared for the two encrypted identifiers (e.g., $1^{st}$ digit component of $1^{st}$ ID vs. $1^{st}$ digit component of $2^{nd}$ ID, $2^{nd}$ digit component of $1^{st}$ ID vs. $2^{nd}$ digit component of $2^{nd}$ ID, $3^{rd}$ digit component of $1^{st}$ ID vs. $3^{rd}$ digit component of $2^{nd}$ ID, and so on). For exact matches (e.g., in deterministic cases), a matching criterion checks that all components match, whereas for partial or non-exact matches (e.g., in non-deterministic cases), a matching criterion checks that a similar but non-exact match property is satisfied (e.g., an above threshold number of matches, a below threshold difference between matches, predetermined statistical combinations of parts that match, etc.).

Dividing encrypted identifiers into its elemental components allows both fast and accurate matching. Components-wise matching allows high levels of parallelism of simple encrypted identifier component units that would not be possible with cumbersome full-length encrypted identifiers. This is particularly important when computing in encrypted space as current methods, such as, fully homomorphic encryption comparisons, are complex and slow. Components-wise matching also avoids unnecessary full-identifier computations by allowing the matching algorithm to terminate early, once a threshold of one or more component mismatches is reached, eliminating wasted computations on further component comparisons. For example, a matching test may be run after each digit-wise comparison, and the match may only proceed if a component-specific and/or cumulative matching criteria are satisfied. In the case of an exact match criterion, if any component of two identifiers do not match, the algorithm may stop without performing the remaining component comparisons, thereby reducing the number of total comparison computations. Accuracy is also improved, where components-wise matching encodes and compares numerical patterns not compared in conventionally number-to-number comparisons. These numerical patterns reveal patterns and properties of encrypted identifiers that transcend their literal numerical values. This is of particular importance in non-deterministic or probabilistic encryption where the exact encrypted value is less important than its patterns and properties.

Figure 1:
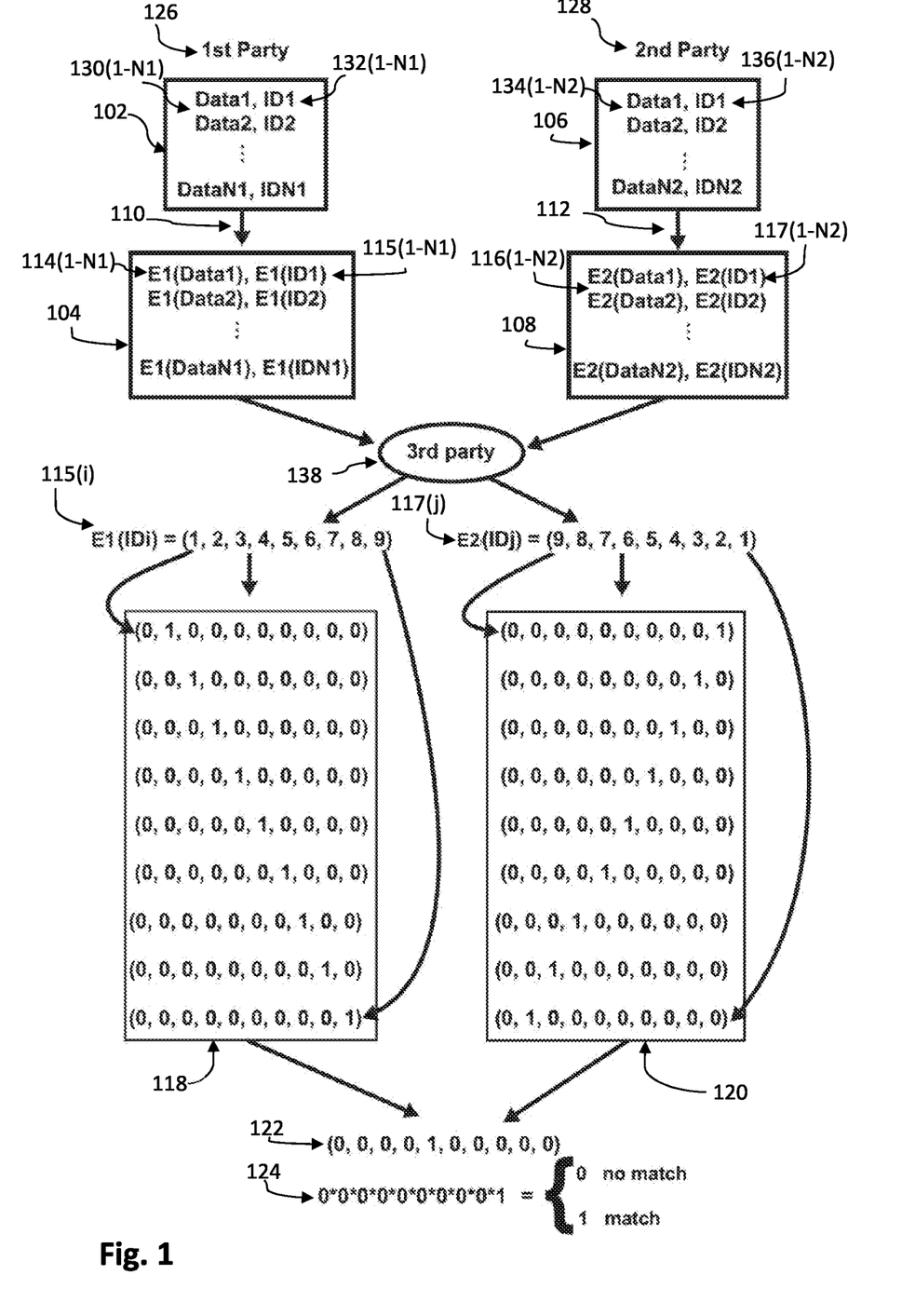
FIG. 1 schematically illustrates data structures for linking encrypted datasets using common identifiers in an encrypted space, according to some embodiments of the invention.

Reference is made to FIG. 1, which schematically illustrates data structures for linking encrypted datasets 104 and 108 using encrypted common identifiers 115 and 117 in an encrypted space, according to some embodiments of the invention. A first and second independent parties 126 and 128 may have respective first and second plaintext data sets 102 and 106 that comprise first and second respective plaintext data 130(1-N1) (e.g., N1 first plaintext data entries) and 134(1-N2) (e.g., N2 second plaintext data entries) and associated first and second respective plaintext identifiers 132(1-N1) (e.g., N1 first identifiers) and 136(1-N2) (e.g., N2 second identifiers). If the plaintext data sets 102 and 106 of respective parties 126 and 128 have common, overlapping, or interrelated data, it may be desirable to link or merge their correlated data 130(i) and 134(j) based on their associated respective corresponding identifiers 132(i) and 136(j).

In some scenarios, e.g., if one or both data sets 102 and 106 contain sensitive information or one or both parties 126 and 128 operate in an untrusted environment, one or both parties 126 and 128 may encrypt one or both respective data sets 102 and 106 to securely share their data, e.g., with each other or with another independent third party 138. First and second parties 126 and 128 may encrypt respective plaintext data sets 102 and 106 using first and second different respective encryption keys 110 and 112 to generate first and second respective encrypted data sets 104 and 108. First and second encrypted data sets 104 and 108 may include first and second respective encrypted data 114(1-N1) and 116(1-N2) (respective encryptions of plaintext data sets 102 and 106) and associated first and second respective encrypted identifiers 115(1-N1) and 117(1-N2) (e.g., N1 respective encryptions of plaintext identifiers 132(1-N1) and N2 respective encryptions of plaintext identifiers 136(1-N2)). Each party may use one or more encryption keys 110 and 112 such that the encrypted data and identifiers cannot be unencrypted without one or more corresponding secret decryption keys. Generally, each party is the sole party who can obtain its secret decryption keys or shares its secret decryption keys with only secure and trusted parties.

A third party 138 may link or merge encrypted data sets 104 and 108 by comparing pairs of their encrypted identifiers 115($i$) and 117($j$) in the encrypted space. Third party 138 may be an independent third party or may be one of the first and second parties 126 and 128. Third party 138 may be a trusted or untrusted device, which may not receive or access the one or more secret encryption keys for decrypting the encrypted data 114 and/or 116 and identifiers 115 and/or 117, and so, may not reveal their corresponding plaintext data 130 and/or 134 and identifiers 132 and/or 136. To improve conventional number-to-number comparisons, which are inefficient in the encrypted space and often do not work for non-deterministic (non-exact) encryption, third party 138 may perform a new efficient identifier comparison by decomposing each of the first and second encrypted identifiers 115(1-N1) and 117(1-N2) into a first and second respective sets of a plurality of elemental identifier components 118 and 120.

Each elemental identifier component in the first and second sets 118 and 120 characterizes a distinct numeric property of the corresponding converted encrypted identifiers 115($i$) and 117($j$). In some embodiments, each elemental identifier component in each set 118 or 120 encodes a different specific digit of the encrypted identifiers. In the example shown in FIG. 1, encrypted identifiers E1(IDi) 115($i$) and E2(IDj) 117($j$) each represent a string of d (e.g., nine) digits of u (e.g., decimal or base-10) possible values (e.g., a social security number). Third party 138 may independently encode each of the d (e.g., nine) digits separately by d (e.g., nine) digit-specific elemental identifier components of length u (e.g., nine vectors of length 10, with 1 indicating the presence of that value for the digit represented by that vector; and 0 otherwise). Each encrypted identifier E1(IDi) 115($i$) and E2(IDj) 117($j$) is thus represented by first and second sets 118 and 120 with a number of d (e.g., nine) elemental identifier components, each of component size u (e.g., ten). Additionally or alternatively, encrypted identifiers 115($i$) and 117($j$) may be converted into a plurality of pattern-specific elemental identifier components, wherein each pattern-specific elemental identifier component encodes a different numerical pattern of the encrypted identifiers. Patterns may encode number patterns, such as, but not limited to, parity, bit length, large vs. small numbers, repeating numbers, edges or visual features in images, or other patterns. It may be appreciated that elemental identifier component sets 118 and 120 may have other component types, numbers and sizes, including non-uniform numbers and sizes, and combinations of multiple different component types, e.g., depending on the type of encoding and/or encryption used.

Storage usage may likewise vary depending on the number and size of the elemental identifier components. In some embodiments, the first and second respective sets of a plurality of elemental identifier components 118 and 120 may be stored in a memory size of $(N_1+N_2)du$ memory slots, where $N_1$ is the number of first encrypted identifiers 115(1-N1) in the first encrypted data set 118, $N_2$ is the number of second encrypted identifiers 117(1-N2) in the second encrypted data set 120, d is the number of the plurality of elemental identifier components in each of the first and second component sets and u is the length of each of the elemental identifier components.

Once encrypted identifiers 115($i$) and 117($j$) are decomposed into their respective elemental encrypted identifier component sets 118 and 120, those encrypted identifier component sets 118 and 120 may be compared by composing their respective elements. Third party 138 may compose the first and second sets of the plurality of elemental identifier components 118 and 120, e.g., component-by-component, to generate a plurality of component-specific results 122. In the example of FIG. 1, there are d (e.g., nine) digit-specific elemental identifier components in each set 118 and 120, resulting in d (e.g., nine) digit-specific compositions (e.g., $1^{st}$ vector of set 118·$1^{st}$ vector of set 120, $2^{nd}$ vector of set 118·$2^{nd}$ vector of set 120). The composition operation may be any generic function or algorithm, which may be, as non-limiting examples, a vector inner-product (e.g., "." as used in FIG. 1), a L1, L2 or Lp norm, a fitting algorithm, etc.

According to some embodiments of the invention, third party 138 may determine whether or not the plurality of component-specific results 122 satisfy a matching criterion 124 indicating that the first and second encrypted identifiers 115($i$) and 117($j$) match. In the example of FIG. 1, the matching criterion 124 may be satisfied when the pair wise compositions of all (or multiple) of the component-specific results 122 is equal to one; and is otherwise not satisfied. According to some embodiments, as in FIG. 1, the matching criterion 124 may be deterministic to determine if there is an exact match between the component sets 118 and 120. Additionally or alternatively, the matching criterion 124 may be non-deterministic or probabilistic to determine if there is a non-exact, approximate, partial, or probabilistic match between the component sets 118 and 120. Such a non-deterministic matching criterion 124 may be useful when using one or more non-deterministic encryption key(s) 110 and/or 112 which produce different encryptions for identical identifiers.

Various combinations of some or all (i,j) pairs of encrypted identifiers 115($i$) and 117($j$) may be compared. In some embodiments, third party 138 may compare all (or a plurality of) $N_1 \cdot N_2$ pairs of $N_1$ first encrypted identifiers 115(1-N1) in the first encrypted data set 104 and $N_2$ second encrypted identifiers 117(1-N2) in the second encrypted data set 108, e.g., to generate $N_1 \cdot N_2$ (or a plurality of) corresponding component specific results 122. In some embodiments, third party 138 may compare only a partial subset of the pairs of encrypted identifiers, e.g., where third party 138 is searching for a particular identifier or stops after finding a threshold number of matches.

Computational complexity may depend on the number of (i,j) pairs of encrypted identifiers 115($i$) and 117($j$) compared, and the number of computations per pairwise comparison. For example, if the number (or order of magnitude) of computations for comparing each single pair of encrypted identifiers 115(i) and 117(j) is M, then third party 138 may perform $N_1 \cdot N_2 \cdot M$ computations (or an order of magnitude thereof) to compare all the combinations of $N_1 \cdot N_2$ pairs of identifiers in encrypted data sets 104 and 108. In the example of FIG. 1, M=d (the number of component-to-component compositions)+the number of matching criterion computations.

According to some embodiments of the invention, decomposing full-length identifiers 115 and 117 into respective elemental identifier component sets 118 and 120 allows independent and parallel compositions that significantly accelerate the comparison process, which is particularly important in the encrypted space where operations are cumbersome and slow. In some embodiments, third party 138 may compose all (or multiple) of the plurality of elemental identifier components of sets 118 and 120 in parallel. In the example of FIG. 1, all (or multiple) of the d (e.g., nine) digit-specific elemental identifier components may be composed simultaneously (e.g., via nine simultaneous vector products), increasing the speed of computation by a factor of d (e.g., nine). In some embodiments, the number of parallel computations may be limited by the parallel processor hardware performing those computations and may be selected according to (e.g., to maximize) its capacity.

According to some embodiments of the invention, each of the plurality of elemental identifier components may be composed in sequence (e.g., $1^{st}$ component composition, $2^{nd}$ component composition, . . . ), but for a plurality of encrypted identifier pairs in parallel. In the example of FIG. 1, each of the d (e.g., nine) digit-specific elemental identifier components may be composed sequentially, one at a time, but for all (or multiple) (i,j) pairs of identifiers 115(i) and 117(j) in parallel (e.g., $1^{st}$ component composition for all (or multiple) of the $N_1 \cdot N_2$ pairs of identifiers 115(1-N1) and 117(1-N2), then in a next sequential iteration the $2^{nd}$ component composition for all (or multiple) of the $N_1 \cdot N_2$ pairs of identifiers 115(1-N1) and 117(1-N2), and so on). Sequentially composing and determining if each of the plurality of component-specific results 122 satisfy a component-specific matching criterion, allows the third party 138 to selectively proceed to the next sequential component-specific result conditional on if the previous component-specific result satisfies the component-specific matching criterion. If the specific previous component-specific result (alone or in combination with one or more other previous results) does not satisfy the component-specific matching criterion, the third party 138 may terminate the sequential process early, prior to completing the determination for the remaining sequentially subsequent component-specific results, and thereby reducing wasted computations to increase speed and efficiency.

According to some embodiments of the invention, the first and second encryption keys 110 and/or 112 may be ring encryption keys of ring dimension n. Using ring encryption may reduce the memory size used to store the encrypted identifiers 115 and 117 and thus their encoded first and second sets of the plurality of elemental identifier components 118 and 120 by a factor of the ring dimension n. In the example above, this reduces the memory usage for storing the first and second sets of elemental identifier components 118 and 120 to $$\frac{(N_1 + N_2)}{n} d u.$$

Using ring encryption also reduces the order of magnitude of the number of computations for comparing pairs of identifiers by a factor of the ring dimension n. In the example above, the number or an order of magnitude of computations to compare all the combinations of $N_1 \cdot N_2$ pairs of identifiers in encrypted data sets 104 and 108 may be $$\frac{N_1 \cdot N_2}{n} \cdot M.$$

According to some embodiments of the invention, the first and second encrypted identifiers 115(1-N1) and 117(1-N2) may be hashed and groups of hashed first and second encrypted identifiers 115(1-N1) and 117(1-N2) may be stored in a plurality of N bins. In this way, groups of encrypted identifiers may be compared and matched together at once, thereby reducing the number of computations, compared to individual identifier pair comparisons. Binning and hashing may reduce the number of computations (or order of magnitude) from $N_1 \cdot N_2 \cdot M$ for individual identifier pair comparisons to $N(c \log N)^2 \cdot M$ for bin-to-bin comparisons, where $N \ll N_1$ and $N_2$. Because $N \ll N_1$ and $N_2$, $N(c \log N)^2 \cdot M \ll N_1 \cdot N_2 \cdot M$, implying that binning provides a dramatic performance improvement factor on the order of $N_1/\log N$. In some embodiments, identifiers in matching bins may automatically match (e.g., when the same exact or similar patterned identifiers are grouped in the same bin) or in some embodiments, subsequent individual identifier comparisons are made within a pair of matching bins to determine individual identifier matches. To prevent the bin or group size from getting too large, the encrypted identifiers (or the group in its entirety) may be hashed. Binning and hashing may reduce the storage usage for storing the first and second sets of the plurality of elemental identifier components 118 and 120 to a memory size of $N(c \log N)^2 \cdot d \cdot u$ memory slots, wherein N is the number of the plurality of bins, $B = c \log N$ is the bin size, and c is a constant.

According to some embodiments of the invention, the first and second encrypted identifiers 115(1-N1) and 117(1-N2) may be twice or dual-hashed. First party 126 may apply a first hash (e.g., Hash1) to first encrypted identifiers 115 (and/or the entire first encrypted data set 104) and/or second party 128 may apply a second hash (e.g., Hash2) to second encrypted identifiers 117 (and/or the entire second encrypted data set 108). Once third party 138 receives the encrypted data sets 104 and 108, it may apply the opposite hash to each data (e.g., Hash2(Hash1(first encrypted identifiers 115)) and Hash1(Hash2(second encrypted identifiers 117))) to generate twice-hashed encrypted identifiers 115(1-N1) and 117 (1-N2). Twice-hashing the data may further reduce memory usage for storing the first and second sets of the plurality of elemental identifier components 118 and 120 to a memory size of $2N(c_2 \log \log N)^2 \cdot d \cdot u$ memory slots, wherein N is the number of the plurality of bins, $B = c \log \log N$ is the bin size resulting from dual-hashing, and $c_2$ is a constant.

Encrypted data sets 104 and 108 (or their corresponding plaintext data sets 102 and 106) may be linked or merged by one of the first and second parties 126 and 128 or third party 138. Once linked or merged, on or more of the parties 126, 128, and/or 138 may perform joint computations securely over the combined data in the encrypted or unencrypted space. For example, the same executed computation may be performed on data that is partially from the first data set 102 or 104 and partially from the second data set 106 or 108.

Data from data sets 102 and 106 or 104 and 108 may be linked by altering the data structures in memory to form one or more new combined data set with hybrid "first-second" data from a combination of both the first and second data sets, or by storing addresses or memory pointers to link elements in the respective data sets. Common or redundant data from the first and second data sets may be merged.

In one scenario, first party 126 encrypts its data set but second party 128 does not, leaving the second data set (or the second identifiers) in unencrypted plaintext form. Such scenarios may be useful, either if the second party's data set (or identifiers) is not sensitive, or if the second party 128 is the third party 138 and so, does not need to encrypt its own data since only the second party will analyze it. Leaving the second data set unencrypted may accelerate the aforementioned comparison computations (reducing M) because the plaintext portions of the comparisons are performed in unencrypted form, which is significantly faster than equivalent comparisons on encrypted data. After the linking is performed by the second party 128, it may send the first party 126 an indication of the linking. First party 126 may then decrypt the encrypted data and link the decrypted data and the retrieved unencrypted data. Any combination of encrypted and unencrypted data sources and secure or unsecure parties may be used.

Any numbers of parties may also be used. When a plurality of P parties each have a separate encryption key, proxy re-encryption may be used to swap encryption keys to effect a chain of comparisons for the sequence of P parties, e.g., as described in U.S. Pat. No. 10,581,812 issued Mar. 3, 2020, which is incorporated herein by reference in its entirety.

Embodiments of the invention provide a solution to the problem of performing a secure joint computation over data stored in two or more encrypted databases provided by different parties. The computation may include two main phases: (1) linking the records across the databases based on common IDs and (2) performing a joint computation for the common records.

In one example, there are three parties: A (first), B (second), and C (third). Parties A and B each provided an encrypted database. The database of party A contains five features for individuals identified with SSNs. The database of party B contains ten other features for SSN-identified individuals. The goal is to compute a linear regression (inference) over common individuals using a provided encrypted or plaintext model. The computation may be performed in a public cloud by party C. Any other number of two or more parties may also be used.

Embodiments of the invention discussed here are tailored for fully homomorphic encryption (FHE), but can also be used in other encrypted computing settings, such as Secure Multi Party (SMC) computation or hybrid FHE-SMC solutions. In particular, the algorithms can be implemented using FHE schemes with batching/packing.

Two Encrypted Databases

Matching Two IDs: A Subroutine for Linking

Each ID may be represented as a string of a number of d characters from an alphabet of size u. For example, consider an SSN of 9 decimal digits, i.e., d=9 and u=10. Each digit for a given ID is stored as a vector of size u with 1 at the location matching the value and 0's everywhere else. In other words, one SSN requires d·u plaintext slots. Two IDs may be matched as follows:

1. Compute the inner products of the vectors for each digit of both individuals. If a specific digit matches, then the inner product for that digit is 1. Otherwise, the inner product is 0.
2. Multiply the inner product results for all digits using the binary tree multiplication technique. If the result is 1, two IDs match. If the result is 0, the IDs do not match.

This procedure is used as a subroutine, referred to as Equal(ID1,ID2).

All Combination Comparison:

The IDs are hashed using functions with uniformly random distribution. Let the database sizes be $N_A$ and $N_B$ for parties A and B, respectively. Let the total size be $N=N_A+N_B$. One or more processor(s) compute $N_A \cdot N_B$ pair-wise equality comparisons to cover all possible combinations.

Storage: Each party may store N·d·u plaintext slots. With batching, this implies $$\frac{N}{n} \cdot d \cdot u$$

ciphertexts, where n is the ring dimension.

Computational Complexity: It may be convenient to estimate the complexity in terms of the equality operations. Let M be the complexity of Equal for one fully packed ciphertext. One or more processor(s) may run $$\frac{N_A \cdot N_B}{n} M$$

operations to perform the linking.

Linking Based on Simple Hashing

If a hashing is used and the number of bins m is set to N, then the maximum load with high probability is e.g., O(log N). The bin size may be defined as B=c log N, where c is a constant (typically between 1 and 6, depending on the estimation technique used to achieve the probability of 1−1/N or higher).

The linking in this case uses the equality comparison of hashes stored in each bin. Consider the case in which only the sum of common IDs is computed between two encrypted databases (other fields may be added for each individual later).

Storage: Each party may have to store $N(c \log N)^2 \cdot d \cdot u$ plaintext slots. With batching, this implies $$\frac{N}{n}(c \log N)^2 \cdot d \cdot u$$

ciphertexts, where n is the ring dimension.

Computational Complexity: It may be convenient to estimate the complexity in terms of the equality operations. Let M be the complexity of Equal for one fully packed ciphertext. One or more processor(s) may run $$\frac{N}{n}(c \log N)^2 M$$

operations to perform the linking.

Linking Based on Two-Choice Hashing

If two hash functions are used, then the bin size B may be reduced to log log N, which is exponentially better than for simple hashing. It is required that the ball is placed in the less-loaded bin. If this technique is used, the storage size may be reduced to $$\frac{2N}{n}(c_2 \log\log N)^2 \cdot d \cdot u,$$

where $c_2$ is a constant. The computational complexity may be reduced to $$\frac{2N}{n}(c_2 \log\log N)^2 M.$$

Linking the Hashes to Encrypted Features

The results of equality comparison may be used to "extract" the encrypted features for parties A and B independently. The same hashing function may be used to locate the encrypted features. The result of comparison may be cloned to as many slots as needed (e.g., to match the number of slots used for encrypted features), and then the vector of cloned comparison values may be multiplied component-wise by the vector of encrypted features.

Afterwards, one or more processor(s) may compute the following:
1. Perform a component-wise computation, and sum up each encrypted feature over all common IDs.
2. Perform a component-wise computation, and sum up all features for each common ID (as in linear or logistic regression inference).

In some embodiments, all these computations may have to be done over the complete databases for A and B because it may be unknown which IDs matched as the linking result is encrypted.

In some embodiments, each encrypted identifier used for comparison may be stored in d*u component slots, where e.g., d is the number of elemental identifier components of size u in the set of components (e.g., 118 or 120). Some embodiments of the invention may combine n/u encrypted identifiers in each ciphertext, where n is the ciphertext or ring dimension. Each encrypted identifier may be decomposed and spread out over d ciphertexts (each digit in a separate ciphertext). The digits of the identifiers may be embedded in the ciphertexts using hashing functions (e.g., either one hashing function in the case of simple hashing or two hashing functions in the case of dual or two-choice hashing). These hashing functions may specify in which ciphertext and which index in that ciphertext a digit of a specific identifier is stored. When the matching of identifiers is complete, instead of d ciphertexts we get 1 ciphertext result with n/u identifiers. The first slot for each identifier may indicate no match (e.g., 0) or indicating a match (e.g., 1) (e.g., the values in the remaining u−1 slots for each identifier may not indicate important data).

Each identifier may have a certain number, m_i, of encrypted features for performing joint computations on, where i is the index of the party. Encrypted features may be assigned to slots in ciphertexts using the same hashing functions that were used for storing the digits of the identifiers (e.g., for both parties). Each ciphertext may store encrypted features for n/m_i identifiers.

The results of matching may be combined with encrypted features, for example, as follows (other procedures may also be used):
1. For each party i, restructure the ciphertexts with the results of matching by cloning each slot (0 or 1) m_i times. This can be done using scalar multiplication (e.g., masking) and log m_i rotations.
2. Multiply the restructured match/no-match ciphertexts by ciphertexts with encrypted features (e.g., the ciphertexts will align as the same hashing functions are used). As a result, such embodiments may generate m_i encrypted features for a given identifier (e.g., if there is a match) or m_i encrypted 0's (e.g., if there is no match).

Computations may then be performed over these "filtered" features. Only the encrypted features for matched identifiers may contribute to the results. The computing party however may not know which are the encrypted features and which are the m_i 0's. Thus, the results of matching stay encrypted. The features themselves are also encrypted. Accordingly, there is no leakage or exposure of sensitive data in all stages (e.g., until the final result is decrypted by a secure party with the secret decryption key(s)).

Joint computations may then be performed over all matched identifiers, for example, according to the follow possible scenarios (other scenarios are also possible):
1. Combine m_1 and m_2 features from parties 1 and 2, and run a machine learning algorithm, e.g., linear or logistic regression training, to compute a model over all matched identifiers.
2. Combine m_1 and m_2 features from parties 1 and 2, and compute an algorithm on them, e.g., linear or regression inference, to get results for each matched identifier. These results may then be aggregated over all (or a plurality of) matched identifiers.
3. Combine m_1 and m_2 features from parties 1 and 2, and compute an algorithm on them, e.g., linear or regression inference, to get results for each matched identifier. If learning the matched identifier is permitted, then the result may be decrypted at this stage.
4. Combine m_1 and m_2 features from parties 1 and 2 (if m_1=m_2 and the features are the same), to compute some aggregates, e.g., bank account balances.

Combining m_1 and m_2 features may be performed using e.g., scalar multiplications (masking) and rotations. One such technique is to take a ciphertext with m_1 features, multiply it by a vector of m_1 1's and n−m_1 0's. Then take a ciphertext with m_2 features, rotate it by m_1, and multiply by a vector with m_2 1's and n−m_2 0's (properly aligned). These two ciphertexts may then be added to get a ciphertext encrypting a vector of m_1+m_2 features. Other more efficient procedures may be employed to operate on data for multiple identifiers at a time (e.g., using Single instruction, multiple data (SIMD) packing).

Guidelines

In some embodiments, if the databases and hashes for both parties are encrypted, the following non-limiting example guidelines may be used:
1. If $N_A$ or $N_B$ is very small (i.e., 1-5 or so), all combination comparisons may be optimal.
2. If N is large and both $N_A$ and $N_B$ are quite large, e.g., comparable, the two-hash approach may be optimal.
3. The simple-hashing approach may be optimal in some intermediate scenarios.

One Encrypted Database and the Other in the Clear

In some embodiments, when there are two parties, party A encrypts its database and sends it to party B. Party B does the linking and secure computation, and then sends the result back to party A for decryption. It is assumed that Party A has a much smaller database. The communication costs can be minimized by using "cuckoo" hashing for party A and simple hashing with e.g. three hash functions for party B.

Figure 2:
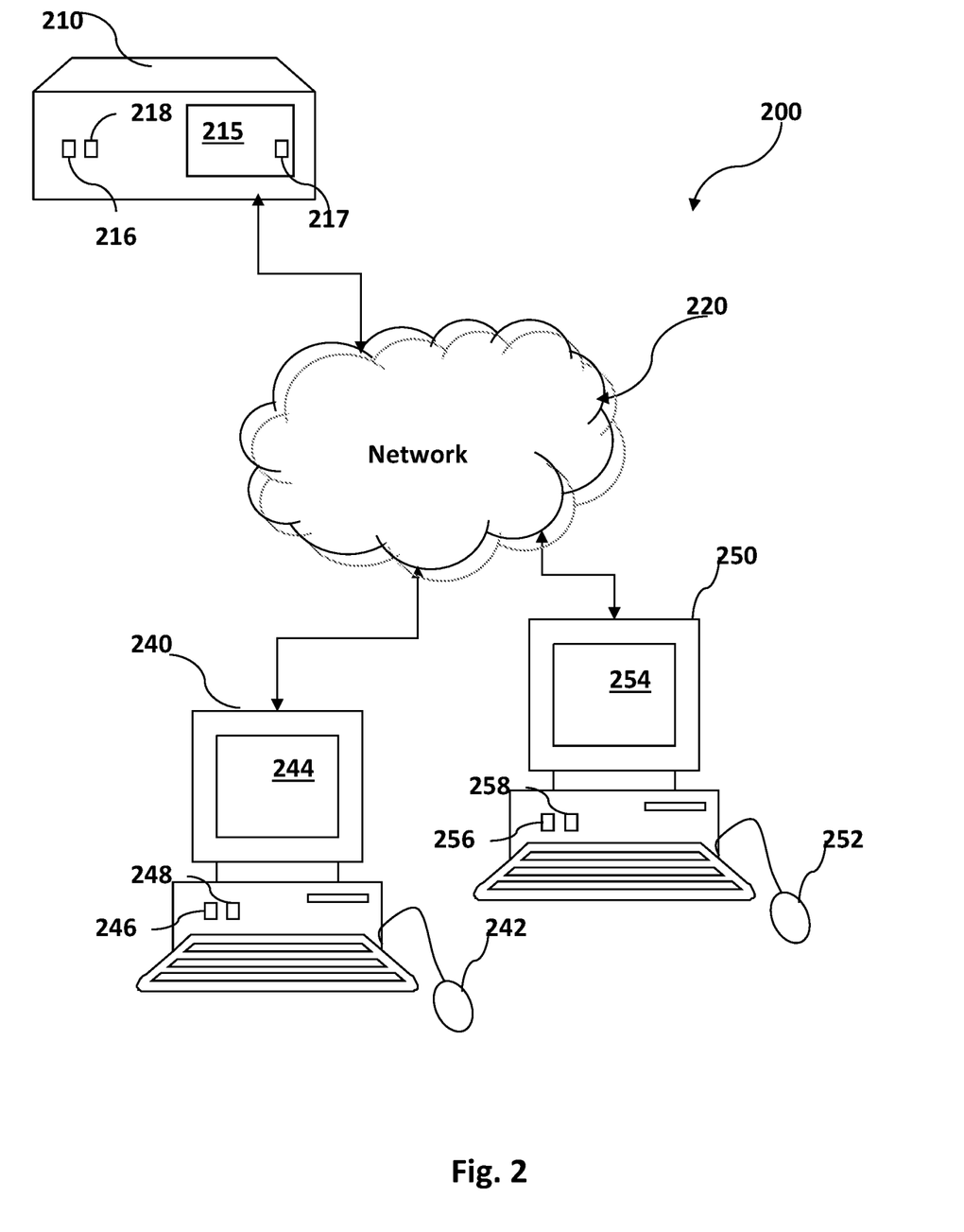
FIG. 2 schematically illustrates a system for linking encrypted datasets using common identifiers in an encrypted space, according to some embodiments of the invention.

Reference is made to FIG. 2, which schematically illustrates a system 200 for linking encrypted datasets using common identifiers in an encrypted space, according to some embodiments of the invention. System 200 may include a first party device 240, a second party device 250, and/or a third party device 210, all of which are connected via a network 220. Third party device 210 may be associated with an independent third party or one of the first or second parties. Any number of a plurality of P party devices in system 200 may be used to correlate common data sets across all (or some) P party devices. Devices of system 200 may be used to execute the operations of the flow chart of FIG. 3.

First and second party devices 240 and 250 may store plaintext data (e.g., 102 and 106, respectively, of FIG. 1), to be encrypted, encrypted data (e.g., 104 and 108, respectively, of FIG. 1) to be decrypted, one or more public encryption keys (e.g., 110 and 112, respectively, of FIG. 1), and/or one or more corresponding private or secret decryption keys (not shown). Secret decryption keys are typically stored only with the originating (e.g., first or second) party, such that, other parties (e.g., third party) do not have access to the secret decryption keys, unless permission is granted by the originating party or the third party is one of the first or second parties. Third party device 210 may store public encryption keys, but typically not private decryption keys, of first party device 240 and second party device 250 (e.g., unless granted permission or if the third party is one of the first or second parties). Third party device 210 may include or be operably connected to a database 215 with software processes or applications for storing and retrieving data 217 such as encryption keys and/or encrypted or decrypted data. Data 217 may also include code (e.g., software code), logic, or circuits, e.g., to enable linking encrypted datasets using common identifiers in an encrypted space according to embodiments of the invention. Database 215 may be internal or external to third party device 210 and may be connected thereto by a local or remote and a wired or wireless connection. In alternate embodiments, data 217 may be stored in an alternate location separate from database 215, e.g., memory unit(s) 258 such is the case when the third party is the second party.

First party device 240 and second party device 250 may include applications for encrypting respective plaintext data (e.g., 102 and 106, respectively, of FIG. 1) using respective encryption keys (e.g., 110 and 112, respectively, of FIG. 1) to generate encrypted data sets (e.g., 104 and 108, respectively, of FIG. 1). Third party device 210 may include applications to access and retrieve the encrypted data sets from the first and second party devices 240 and 250 via network 220. Third party device 210 may include applications for linking the data of the first and second party devices 240 and 250, performing joint computations over the linked encrypted data, and transferring encrypted results of said computations to the first and/or second party devices 240 and 250 via network 220. First and second party devices may include applications for retrieving and decrypting encrypted results sent from third party device 210 via network 220. Additionally or alternatively, third party device 210 may include applications to decrypt encrypted data and/or computation results. Additionally or alternatively, third party device 210 may include applications transferring received encrypted data to another not shown trusted party device that may itself include applications to perform computations and transfer encrypted results.

First, second, and third party devices 240, 250, and 210 may be servers, personal computers, desktop computers, mobile computers, laptop computers, and notebook computers or any other suitable device such as a cellular telephone, personal digital assistant (PDA), video game console, etc., and may include wired or wireless connections or modems, or users operating such devices. First and second party devices 240 and 250 may include one or more input devices 242 and 252, respectively, for receiving input from a user (e.g., via a pointing device, click-wheel or mouse, keys, touch screen, recorder/microphone, other input components). First and second party devices 240 and 250 may include one or more output devices 244 and 254, respectively, (e.g., a monitor or screen) for displaying data to a user provided by or for third party device 210.

Network 220, which connects third party device 210 and user computers 240 and 250, may be any public or private network such as the Internet. Access to network 220 may be through wire line, terrestrial wireless, satellite or other systems well known in the art.

First party device 250, second party device 240, and third party device 210, may include one or more controller(s) or processor(s) 216, 246, and 256, respectively, for executing operations according to embodiments of the invention and one or more memory unit(s) 218, 248, and 258, respectively, for storing data (e.g., keys and encrypted or decrypted data) and/or instructions (e.g., software for applying keys to encrypt or decrypt data, or link encrypted data, according to embodiments of the invention) executable by the processor(s). Processor(s) 216, 246, and/or 256 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 218, 248, and/or 258 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

According to some embodiments of the invention, other devices or combinations of devices may be used in system 200. Components from multiple different devices may be combined into a single device or components from a single device may be separated into multiple different devices that may also be used in system 200.

Figure 3:
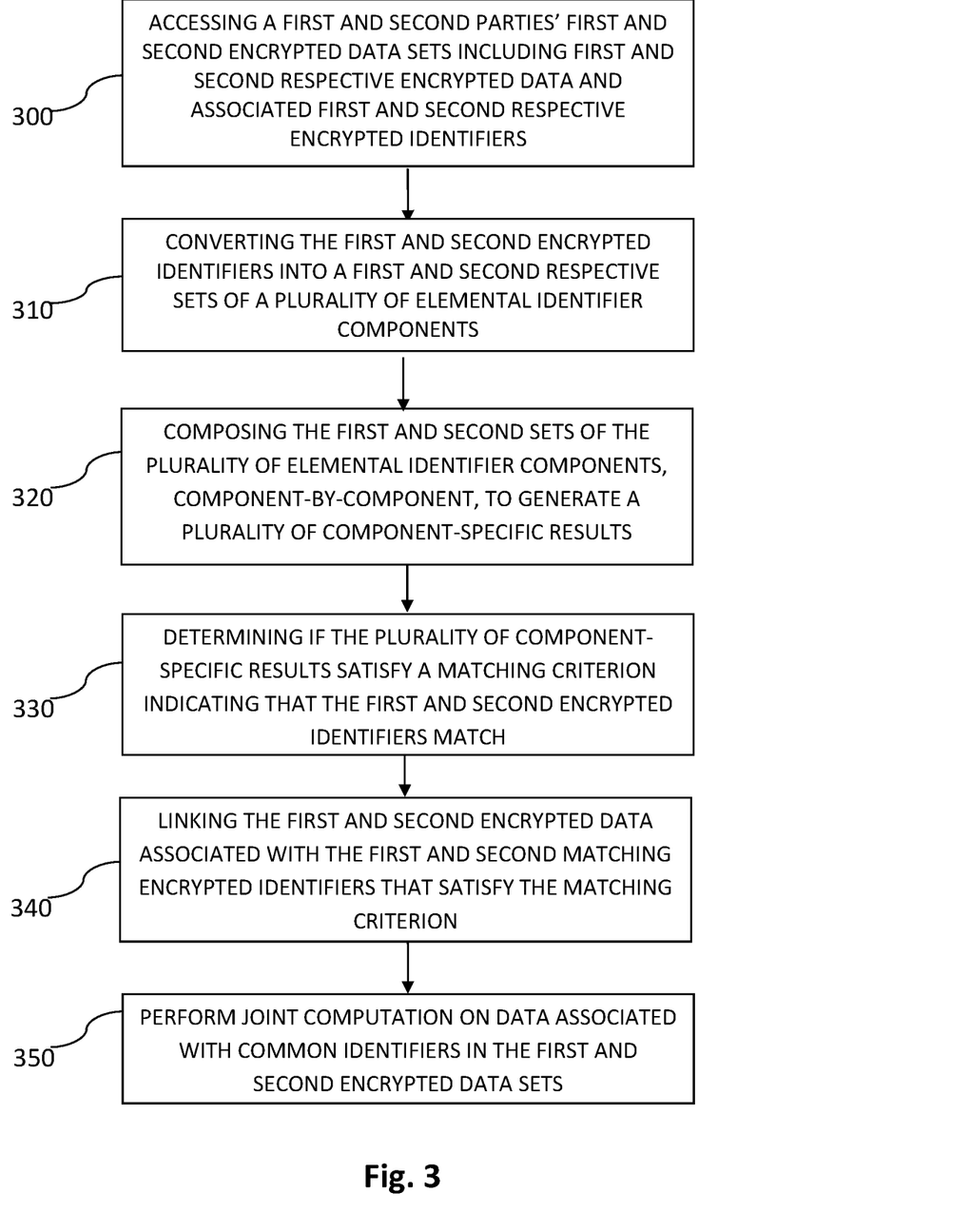
FIG. 3 is a flowchart of a method for linking encrypted datasets using common identifiers in an encrypted space, according to some embodiments of the invention.

Reference is made to FIG. 3, which schematically illustrates a flowchart of a method for linking encrypted datasets using common identifiers in an encrypted space, according to some embodiments of the invention. The operation(s) of FIG. 3 may be performed using devices or components disclosed in reference to the system of FIG. 2, using the data structures disclosed in reference to FIG. 1. For example, the operation(s) of FIG. 3 may be performed using one or more processors 216 of third party device 210 of FIG. 2, but may additionally or alternatively be performed using one or more processors 248 of first party device 240 of FIG. 2 or one or more processors 258 of second party device 250 of FIG. 2. Other devices or systems may also be used.

In operation 300, one or more processors (e.g., 216 of FIG. 2) may access encrypted data sets (e.g., 104 and 108, respectively, of FIG. 1) from a first party device (e.g., 240 of FIG. 2) and a second party device (e.g., 250 of FIG. 2). These data sets may include first and second respective encrypted data (e.g., 114(1-N1) and 116(1-N2), respectively, of FIG. 1) and associated first and second respective encrypted identifiers (e.g., 115(1-N1) and 117(1-N2), respectively, of FIG. 1). The encrypted data is generated by each of the first and second parties encrypting their plaintext data sets (e.g., 102 and 106, respectively, of FIG. 1) using their same or different encryption keys (e.g., 110 and 112, respectively, of FIG. 1). The encrypted data and identifiers may not be decrypted without one or more secret or private decryption keys associated with the respective encryption keys. The encryption may effect fully homomorphic encryption (FHE), Secure Multi Party (SMC) computation, hybrid FHE-SMC solutions and/or any other type that allows computations to be performed in encrypted space.

In operation 310, one or more processors (e.g., 216 of FIG. 2) may convert encrypted identifiers (e.g., 115(1-N1) and 117(1-N2), respectively, of FIG. 1) from a first party device (e.g., 240 of FIG. 2) and second party device (e.g. 250 of FIG. 2) to a first and second respective sets of a plurality of elemental identifier components (e.g., 118 and 120, respectively, of FIG. 1). Each of the plurality of elemental identifier components in each component set may characterize a distinct numeric property of the corresponding converted encrypted identifier (e.g., 115($i$) and 117($j$) of FIG. 1). In some embodiments, the numeric property is a digit-specific encoding, such that the one or more processors (e.g., 216 of FIG. 2) may convert each encrypted identifier (e.g., 115(1-N1) or 117(1-N2) of FIG. 1) to a plurality of digit-specific elemental identifier components (e.g., 118 and 120, respectively, of FIG. 1), where each digit-specific elemental identifier component encodes a different specific digit of the encrypted identifiers (e.g., 115($i$) and 117($j$) of FIG. 1). Additionally or alternatively, the numeric property is a pattern-specific encoding, such that the one or more processors (e.g., 216 of FIG. 2) may convert each encrypted identifier (e.g., 115(1-N1) or 117(1-N2) of FIG. 1) to a plurality of pattern-specific elemental identifier components, where each pattern-specific elemental identifier component may encode a different specific digit of the encrypted identifiers.

In some embodiments, the one or more processors (e.g., 216 of FIG. 2) may store in one or more memories (e.g., 215 or 218 of FIG. 2) the first and second set of the plurality of elemental identifier components (e.g., 118 and 120, respectively, of FIG. 1) in a memory size of, e.g., $(N_1+N_2) \cdot d \cdot u$ memory slots, where $N_1$ is the number of first encrypted identifiers (e.g., 115(1-N1 of FIG. 1) in the first encrypted data set (e.g., 114(1-N1) of FIG. 1), $N_2$ is the number of second encrypted identifiers (e.g. 117(1-N2) of FIG. 1) in the second encrypted data set (e.g., 116(1-N2) of FIG. 1), d is the number of the plurality of elemental identifier components (e.g., 118 and 120, respectively, of FIG. 1) in each of the first and second component sets, and u is the length of each of the elemental identifier components.

In operation 320, one or more processors (e.g., 216 of FIG. 2) may compose the first and second sets of the plurality of elemental identifier components (e.g., 118 and 120, respectively, of FIG. 1), e.g., component-by-component, to generate a plurality of component-specific results (e.g. 122 of FIG. 1).

In some embodiments, the one or more processors (e.g., 216 of FIG. 2) may compose all (or multiple) of the plurality of d elemental identifier components (e.g., 118 and 120, respectively, of FIG. 1) in parallel. For example, processor 216 of FIG. 2 may be a parallel processor that may execute operation 320 simultaneously for all (or most) of the d elemental identifier component pairs.

In some embodiments, the one or more processors (e.g., 216 of FIG. 2) may compose each of the plurality of d elemental identifier components (e.g., 118 and 120, respectively, of FIG. 1) in sequence. Each sequential elemental identifier component (e.g., 1, 2, . . . , d) may be composed for a plurality of pairs of first and second respective encrypted identifiers (e.g., 115(1-N1) and 117(1-N2)), respectively, of FIG. 1) in sequence, one (e.g., ith) component after another (e.g., i-1th) component. Operation 320 may be executed in d sequential iterations for each pair of elemental identifiers (e.g., 115($i$) and 117($j$)) on a component by component basis, but each single component operation 320 may be executed simultaneously multiple times, in parallel, for a plurality of different first and second encrypted identifier pairs (e.g., 115(1-N1) and 117(1-N2)). In some embodiments, the one or more processors (e.g., 216 of FIG. 2) may determine if each of the plurality of component-specific results (e.g. 122 of FIG. 1) satisfy a component-specific matching criterion (e.g., 124 of FIG. 1) and may proceeding to the next sequential component-specific result (e.g., 122 of FIG. 1) of operation 320, conditional on if the previous component-specific result (e.g., 122 of FIG. 1) is determined to satisfy the component-specific matching criterion (e.g., 124 of FIG. 1). If the component-specific matching criterion is not determined to satisfy the matching criterion, the one or more processors may terminate operation 320 prior to completing the determination for the remaining sequentially subsequent component-specific results (e.g., 122 of FIG. 1).

In operation 330, one or more processors (e.g., 216 of FIG. 2) may determine if the plurality of component-specific results (e.g., 122 of FIG. 1) satisfies a matching criterion (e.g., 122 of FIG. 1) indicating that the first and second encrypted identifiers (e.g., 115(1-N1) and 117(1-N2), respectively, of FIG. 1) match. The matching criterion may determine an exact match between the set of first and second component-specific results (e.g., 122 of FIG. 1) to indicate a deterministic match. Additionally or alternatively, the matching criterion may determine a non-exact partial or probabilistic match between the component-specific results (e.g., 122 of FIG. 1) to indicate a non-deterministic match.

In some embodiments, the one or more processors (e.g., 216 of FIG. 2) may determine if all combinations of $N_1 \cdot N_2$ pairs of $N_1$ first encrypted identifiers (e.g., 115(1-N1) of FIG. 1) in the first encrypted data set (e.g., 114(1-N1) of FIG. 1) from the first party device (e.g., 240 of FIG. 2) match the $N_2$ second encrypted identifiers (e.g., 117(1-N2) of FIG. 1) in the second encrypted data set (e.g., 116(1-N2) of FIG. 1) from the second party device (e.g., 250 of FIG. 2). In some embodiments, the one or more processors (e.g., 216 of FIG. 2) may determine if all (i,j) combinations of $N_1 \cdot N_2$ pairs of identifiers (e.g., 115(1-N1) and 117(1-N2) of FIG. 1) match in an order of $N_1 \cdot N_2 \cdot M$ computations, where M is the number of computations performed for determining if each pair of identifiers match.

In some embodiments, the one or more processors (e.g., 216 of FIG. 2) may use ring encryption to reduce the memory size for storing the first and second sets of the plurality of elemental identifier components (e.g., 118 and 120, respectively, of FIG. 1) by a factor of the ring dimension n. The order of computations may also be reduced for determining if each pair of identifiers match by a factor of the ring dimension n.

In some embodiments, the one or more processors (e.g., 216 of FIG. 2) may hash the encrypted identifiers (e.g., 115(1-N1) and 117(1-N2), respectively, from FIG. 1). Groups of the first and second hashed encrypted identifiers may be stored in a plurality of bins. Entire bins or their groups of first and second hashed encrypted identifiers may be compared, e.g., bin-to-bin, to determine if the groups/bins match. In some embodiments, the one or more processors (e.g., 216 of FIG. 2) may store the first and second sets of the plurality of elemental identifier components (e.g., 118 and 120, respectively, of FIG. 1) in a memory size of $N(c \log N)^2 \cdot d \cdot u$ memory slots, where N is the number of the plurality of bins, $B = c \log N$ is the bin size, d is the number of the plurality of elemental identifier components in each of the first and second component sets (e.g., 118 and 120, respectively, of FIG. 1), u is the length of each of the elemental identifier components, and c is a constant. In some embodiments, the one or more processors (e.g., 216 of FIG. 2) may determine if the groups of first and second hashed encrypted identifiers in each bin match in an order of $N(c \log N)^2 \cdot M$ computations, where M is the number of computations performed for determining if identifiers in each pair of bins match.

In some embodiments, the one or more processors (e.g., 216 of FIG. 2) may hash using a dual-hash, in which a first hash is applied by a first party and a second hash is applied by the second party to generate twice-hashed encrypted identifiers. When using a dual-hash, the one or more processors (e.g., 216 of FIG. 2) may store the first and second sets of the plurality of elemental identifier components (e.g., 118 and 120, respectively, of FIG. 1) in a memory size of $2N(c_2 \log \log N)^2 \cdot d \cdot u$ memory slots, where N is the number of the plurality of bins, $B = c_2 \log \log N$ is the bin size resulting from dual-hashing, d is the number of the plurality of elemental identifier components in each of the first and second component sets (e.g., 118 and 120, respectively, of FIG. 1), u is the length of each of the elemental identifier components, and $c_2$ is a constant.

In operation 340, one or more processors (e.g., 216 of FIG. 2) may link encrypted data (e.g., 114(1-N1) and 116(1-N2), respectively, of FIG. 1) associated with the first and second matching encrypted identifiers (e.g., 115(1-N1) and 117(1-N2), respectively, of FIG. 1) from a first party device (e.g., 240 of FIG. 2) and second party device (e.g., 250 of FIG. 2) that satisfy the matching criterion (e.g., 124 of FIG. 1). Operation 340 may be executed to link the first and second encrypted data by altering data structures in one or more memories (e.g., 215, 218, 248, and/or 258 of FIG. 2) to form a new data set combining data from both the first and second data sets. Additionally and/or alternatively, operation 340 may be executed to link the first and second encrypted data by storing addresses or memory pointers to link elements of the respective first and second encrypted data sets (114(1-N1) and 116(1-N2), respectively, of FIG. 1). Operation 340 may be executed to merge redundant data between the first and second encrypted data sets.

In operation 350, one or more processors (e.g., 216, 246, 256 of FIG. 2 and/or a different processor by the same or different party) may perform joint computations over linked data (e.g., 114(1-N1) and 116(1-N2), respectively, of FIG. 1) associated with common identifiers in the first and second encrypted data sets.

Other or additional operations may be executed in the same or different order.

Embodiments of the invention may include an article such as a non-transitory computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments. Accordingly, the scope of the invention should not be limited by what has thus far been described, but by the appended claims and their legal equivalents.

The invention claimed is:

1. A method for linking encrypted data sets using common encrypted identifiers in an encrypted space, the method comprising:

accessing a first and second encrypted data sets via a first party device and a second party device, respectively, independently encrypted by a first and second respective parties, wherein the first and second encrypted data sets comprise first and second respective encrypted data and associated first and second respective encrypted identifiers, and wherein the data and identifiers cannot be unencrypted without one or more secret decryption keys;

converting the first and second encrypted identifiers into a first and second respective sets of a plurality of elemental identifier components, wherein each of the plurality of elemental identifier components in each component set characterizes a distinct numeric property of the corresponding converted encrypted identifier;

composing the first and second sets of the plurality of elemental identifier components, component-by-component, to generate a plurality of component-specific results;

determining if the plurality of component-specific results satisfy a matching criterion indicating that the first and second encrypted identifiers match; and linking the first and second encrypted data associated with the first and second matching encrypted identifiers from the first party device and the second party device, respectively, that satisfy the matching criterion.

2. The method of claim 1 comprising composing a plurality of the plurality of elemental identifier components in parallel.

3. The method of claim 1 comprising composing each of the plurality of elemental identifier components in sequence, where each sequential elemental identifier component composition is executed for a plurality of pairs of first and second respective encrypted identifiers in parallel.

4. The method of claim 3 comprising sequentially determining if each of the plurality of component-specific results satisfy a component-specific matching criterion, and proceeding to the next sequential component-specific result conditional on if the previous component-specific result satisfies the component-specific matching criterion; and otherwise terminating the determination prior to completing the determination for the remaining sequentially subsequent component-specific results.

5. The method of claim 1, wherein the encrypted identifiers are converted to a plurality of digit-specific elemental identifier components, wherein each digit-specific elemental identifier component encodes a different specific digit of the encrypted identifiers.

6. The method of claim 1, wherein the encrypted identifiers are converted to a plurality of pattern-specific elemental identifier components, wherein each pattern-specific elemental identifier component encodes a different numerical pattern of the encrypted identifiers.

7. The method of claim 1 comprising storing the first and second sets of the plurality of elemental identifier components in a memory size of $(N_1+N_2) \cdot d \cdot u$ memory slots, where $N_1$ is the number of first encrypted identifiers in the first encrypted data set, $N_2$ is the number of second encrypted identifiers in the second encrypted data set, d is the number of the plurality of elemental identifier components in each of the first and second component sets and u is the length of each of the elemental identifier components.

8. The method of claim 1 comprising determining if all combinations of $N_1 \cdot N_2$ pairs of $N_1$ first encrypted identifiers in the first encrypted data set and $N_2$ second encrypted identifiers in the second encrypted data set match.

9. The method of claim 8 comprising determining if all the combinations of $N_1 \cdot N_2$ pairs of identifiers match in an order of $N_1 \cdot N_2 \cdot M$ computations, where M is the number of computations performed for determining if each pair of identifiers match.

10. The method of claim 1, wherein a ring encryption is used of ring dimension n, reducing a memory size for storing the first and second sets of the plurality of elemental identifier components by a factor of the ring dimension n, and reducing an order of computations for determining if each pair of identifiers match by a factor of the ring dimension n.

11. The method of claim 1 comprising:
hashing the first and second encrypted identifiers;
storing groups of the first and second hashed encrypted identifiers in a plurality of bins; and
determining if the groups of first and second hashed encrypted identifiers in each bin match.

12. The method of claim 11 comprising storing the first and second sets of the plurality of elemental identifier components in a memory size of $N(c \log N)^2 \cdot d \cdot u$ memory slots, wherein N is the number of the plurality of bins, $B=c\log N$ is the bin size, d is the number of the plurality of elemental identifier components in each of the first and second component sets, u is the length of each of the elemental identifier components, and c is a constant.

13. The method of claim 11 comprising determining if the groups of first and second hashed encrypted identifiers in each bin match in an order of $N(c \log N)^2 \cdot M$ computations, where M is the number of computations performed for determining if identifiers in each pair of bins match.

14. The method of claim 11, wherein the hashing comprises a dual-hash, in which a first hash is applied by the first party and a second hash is applied by the second party to generate twice-hashed encrypted identifiers.

15. The method of claim 14 comprising storing the first and second sets of the plurality of elemental identifier components in a memory size of $2N(c_2 \log \log N)^2 \cdot d \cdot u$ memory slots, wherein N is the number of the plurality of bins, $B=c_2 \log \log N$ is the bin size resulting from dual-hashing, d is the number of the plurality of elemental identifier components in each of the first and second component sets, u is the length of each of the elemental identifier components, and $c_2$ is a constant.

16. The method of claim 1, wherein the matching criterion is used to determine an exact match between the set of first and second component-specific results to indicate a deterministic match.

17. The method of claim 1, wherein the matching criterion is used to determine a non-exact partial or probabilistic match between the component-specific results to indicate a non-deterministic match.

18. The method of claim 1, wherein the encryption is selected from the group consisting of: fully homomorphic encryption (FHE), Secure Multi Party (SMC) computation, and hybrid FHE-SMC solutions.

19. A method for linking encrypted data sets by comparing pairs of one encrypted identifier and one unencrypted identifier, the method comprising:

receiving, from an external party device, an encrypted data set comprising encrypted data and associated encrypted identifiers, but not receiving one or more secret encryption keys required to decrypt the encrypted data and encrypted identifiers;

retrieving, from memory, a unencrypted plaintext data set comprising unencrypted data and associated unencrypted identifiers, converting the encrypted and unencrypted identifiers into respective encrypted and unencrypted sets of a plurality of elemental identifier components, wherein each of the plurality of elemental identifier components in each component set characterizes a distinct numeric property of the corresponding respective converted encrypted and unencrypted identifier;

composing the encrypted and unencrypted sets of the plurality of elemental identifier components, component-by-component, to generate a plurality of component-specific results;

determining if the plurality of component-specific results satisfy a matching criterion indicating that the encrypted and unencrypted identifiers match;

linking the encrypted and unencrypted data associated with the encrypted and unencrypted matching encrypted identifiers from the external party device match; and sending the external party an indication of the linking to decrypt the encrypted data and link the decrypted data and the retrieved unencrypted data.

20. A system for linking encrypted data sets using common encrypted identifiers in an encrypted space, the system comprising:

one or more memories configured to store a first and second encrypted data sets independently encrypted by a first and second respective parties, wherein the first and second encrypted data sets comprise first and second respective encrypted data and associated first and second respective encrypted identifiers, and wherein the data and identifiers cannot be unencrypted without one or more secret decryption keys; and one or more processors configured to:

convert the first and second encrypted identifiers into a first and second respective sets of a plurality of elemental identifier components, wherein each of the plurality of elemental identifier components in each component set characterizes a distinct numeric property of the corresponding converted encrypted identifier, compose the first and second sets of the plurality of elemental identifier components, component-by-component, to generate a plurality of component-specific results, determine if the plurality of component-specific results satisfy a matching criterion indicating that the first and second encrypted identifiers match, and link the first and second encrypted data associated with the first and second matching encrypted identifiers that satisfy the matching criterion.

21. The system of claim 20, wherein the one or more processors are configured to compose a plurality of the plurality of elemental identifier components in parallel.

22. The system of claim 20, wherein the one or more processors are configured to compose each of the plurality of elemental identifier components in sequence, and execute each sequential elemental identifier component composition for a plurality of pairs of first and second respective encrypted identifiers in parallel.

23. The system of claim 22, wherein the one or more processors are configured to sequentially determine if each of the plurality of component-specific results satisfy a component-specific matching criterion, and proceed to the next sequential component-specific result conditional on if the previous component-specific result satisfies the component-specific matching criterion; and otherwise terminate the determination prior to completing the determination for the remaining sequentially subsequent component-specific results.

24. The system of claim 20, wherein the one or more memories are configured to store the first and second sets of the plurality of elemental identifier components in a memory size of $(N_1+N_2) \cdot d \cdot u$ memory slots, where $N_1$ is the number of first encrypted identifiers in the first encrypted data set, $N_2$ is the number of second encrypted identifiers in the second encrypted data set, d is the number of the plurality of elemental identifier components in each of the first and second component sets and u is the length of each of the elemental identifier components.

25. The system of claim 20, wherein the one or more processors are configured to determine if all combinations of $N_1 \cdot N_2$ pairs of $N_1$ first encrypted identifiers in the first encrypted data set and $N_2$ second encrypted identifiers in the second encrypted data set match.

26. The system of claim 25, wherein the one or more processors are configured to determine if all the combinations of $N_1 \cdot N_2$ pairs of identifiers match in an order of $N_1 \cdot N_2 \cdot M$ computations, where M is the number of computations performed for determining if each pair of identifiers match.

27. The system of claim 20, wherein a ring encryption is used of ring dimension n, and wherein the one or more processors are configured to reduce a memory size for storing the first and second sets of the plurality of elemental identifier components by a factor of the ring dimension n, and reducing an order of computations for determining if each pair of identifiers match by a factor of the ring dimension n.

28. The system of claim 20, wherein the one or more processors are configured to:

hash the first and second encrypted identifiers, store groups of the first and second hashed encrypted identifiers in a plurality of bins, and determine if the groups of first and second hashed encrypted identifiers in each bin match.

29. The system of claim 28, wherein the hashing comprises a dual-hash, in which a first hash is applied by the first party and a second hash is applied by the second party to generate twice-hashed encrypted identifiers.

30. The system of claim 20, wherein the one or more processors are configured to link the first and second encrypted data by altering their respective data structures in the one or more memories to form one or more new combined data set with data from a combination of both the first and second data sets, or by storing memory pointers linking the first and second encrypted data in the respective first and second encrypted data sets.

* * * * *